Jan. 8, 1957

K. G. JOHNSON

DEVICE FOR CONNECTION OF MARKERS
IN AUTOMATIC TELEPHONE SYSTEMS 2,777,014

Filed Feb. 9, 1955

2 Sheets-Sheet 1

INVENTOR
KARL GEORG JOHNSON
BY [signature]
ATTORNEY

Jan. 8, 1957 K. G. JOHNSON 2,777,014

DEVICE FOR CONNECTION OF MARKERS IN AUTOMATIC TELEPHONE SYSTEMS

Filed Feb. 9, 1955 2 Sheets-Sheet 2

INVENTOR
KARL GEORG JOHNSON
BY [signature]
ATTORNEY 2,777,014
Patented Jan. 8, 1957

2,777,014

DEVICE FOR CONNECTION OF MARKERS IN AUTOMATIC TELEPHONE SYSTEMS

Karl Georg Johnson, Stockholm, Sweden, assignor to Telefonaktiebolaget L M Ericsson, Stockholm, Sweden, a corporation of Sweden Application February 9, 1955, Serial No. 487,125

Claims priority, application Sweden March 8, 1954

1 Claim. (Cl. 179—18)

The present invention relates to automatic telephone systems with markers which set up only one connection at a time over each selection stage. As a principle one marker only is required in such systems, but with regard to the reliability of operation two markers are usually arranged, said markers either operating every other time or replacing each other each time one of them shows a fault. The operation process in a marker is a process proceeding in steps, lines and selecting devices for one selecting stage at a time being chosen and set, respectively, by means of selecting relay chains and marking circuits. Each marker comprises a number of gradually operating selecting relay chains, each of said selecting relay chains comprising a large number of contacts connected in series. Most of the occurring faults relate to selecting relay chains. Special connecting relays for the lines and apparatuses belonging to the system are required for each marker. According to hitherto used principles a marker is quite unable to operate as soon as any of the selecting relay chains is faulty.

The object of the present invention is to obtain with one marker only a greater reliability of operation than is obtained with two markers. This is obtained by arranging for each selecting relay chain in the marker a second relay chain comprising a relay for each of the lines or apparatuses belonging to the selecting relay chain and contacts on said relays preventing more than one relay at a time to operate, a rectifier in the make-circuit for each of the relays in as well the first as the second relay chain, for preventing the appearance of leakage current paths and a switch which keeps one of the relay chains disconnected, when a relay in the other relay chain operates its armature, and by the relays belonging to the same line or apparatus in the two relay chains both being connected to the same marking wires coming from the line and the apparatus, respectively.

By arranging two selecting relay chains for each selecting stage the marker is set out of function only if a fault arises at the same time in the two selecting relay chains for one of the selecting stages. The number of selecting relay chains is the same as for two markers, but the reliability of operation is greater, since after a fault has arisen, the next fault must be localized in a determined relay chain instead of in any one of a number of relay chains in order to be able to cause discontinuance of traffic.

The invention will be more closely described by means of the attached drawings, Figs. 1–2.

Figure 1:
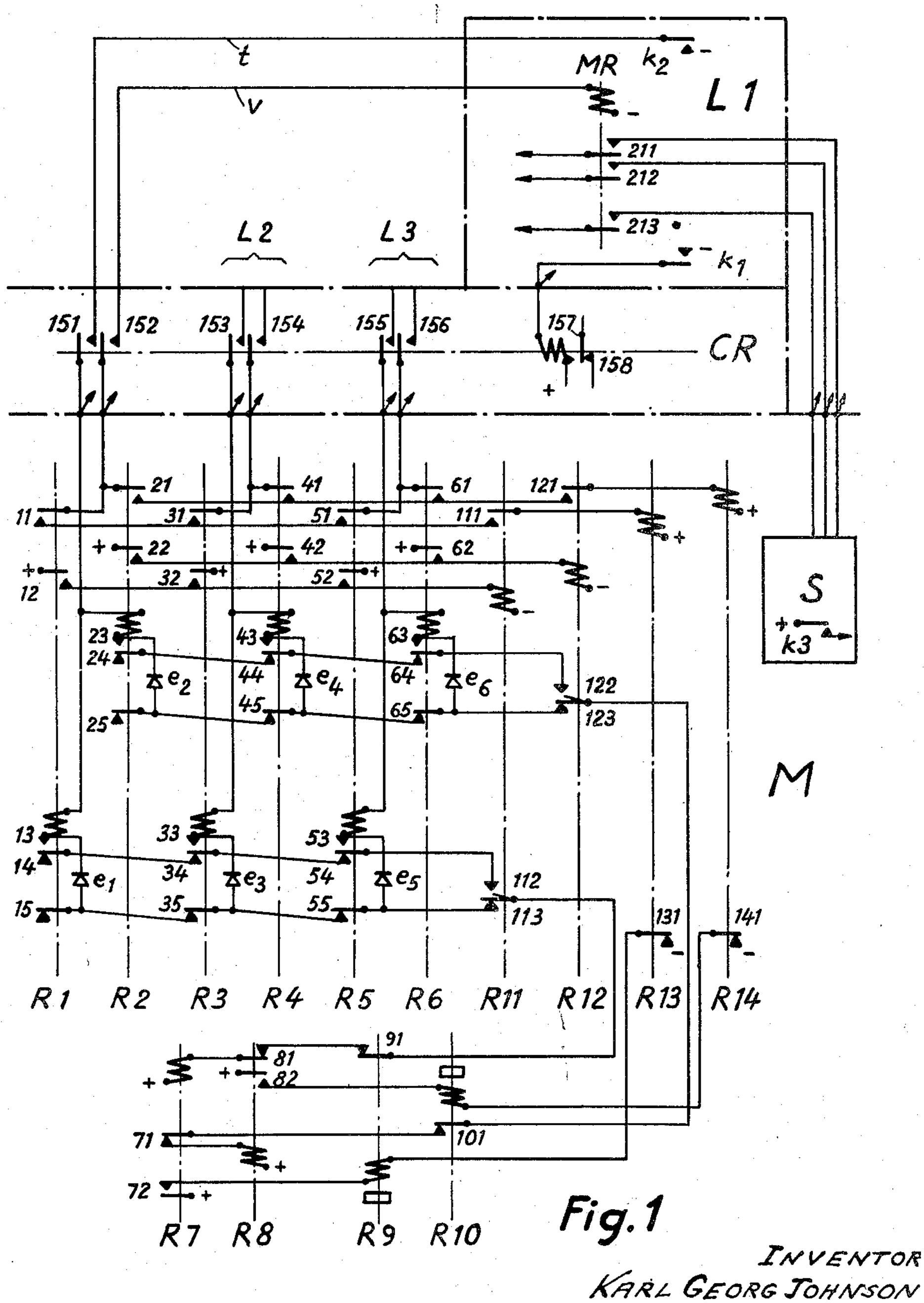
Fig. 1 shows a selecting relay chain for connection of a calling line to a marker.

In Fig. 1, L1 is a part of a line equipment, CR a connecting relay for a number of lines L1—L3, which form a line group, and M is a marker comprising as well a signal receiving device S as two selecting relay chains R1—R14 connected in parallel. Several other pairs of selecting relay chains are comprised in the marker M, one of said chains being shown in Fig. 2. The connecting relay CR is presupposed to be included in a relay chain, in which for instance a relay chain of the same shape, as that which is formed by the relay R1—R14 and which will be described below, can be attracted by only one relay at a time. Upon call to the marker M from the line L1 two contacts *k1* and *k2* are closed. The contact *k1* closes a circuit over the relay CR, the armature of which is attracted if the marker is disengaged. The contacts 151—158 are actuated. The following circuits are closed over the contact *k2*.

(*a*) +, the winding of relay R8, the contacts 71, 101, 123, 65 and 45, rectifier *e2*, the winding of relay R2, contact 151, wire *t* and contact *k2*, to negative.

(*b*) +, the winding of relay R7, the contacts 81, 91, 113, 55 and 35, rectifier *e1*, the winding of relay R1, the contacts 151 and *k2*, to negative. The relays R7 and R8 are equal and that relay which for the moment is quickest cuts off the other one.

It is supposed that relay R7 is quicker than relay R8, and therefore first relay R7 and then relay R1 are energized. The contacts 71—72 and 11—15 are actuated. Relay R11 is energized over contact 12 and is attracted. The contacts 111—113 are actuated. The relays R7 and R1 are then kept energized over the contacts 81, 91, 112, 54, 34 and 13. The relay R13 and the relay MR in the line equipment of line 1 are energized over the contacts 111, 11 and 152 and wire *v*, and their armatures are attracted. The contacts 131 and 211—213 close and connect line L1 or signal wires pertaining to said line to the signal receiving device S in the marker. It is evident, that if the call had come from any of the lines L2 or L3, an analogous switching operation would have taken place, but the relays R3 and R5, respectively, would have been energized instead of R1. Contact 72 closes a circuit for a supervisory relay R9 which is slow-operating and normally prevented from being energized by the contact 131 being actuated. Should there be any fault in the relay chain R1, R3, R5, relay R9 will actuate contact 91. Relay R7 releases its armature and the relay chain R2, R4, R6 is connected. The relays R8, R2, R12 and R14 and MR are energized in the circuit shown on the drawing.

Figure 2:
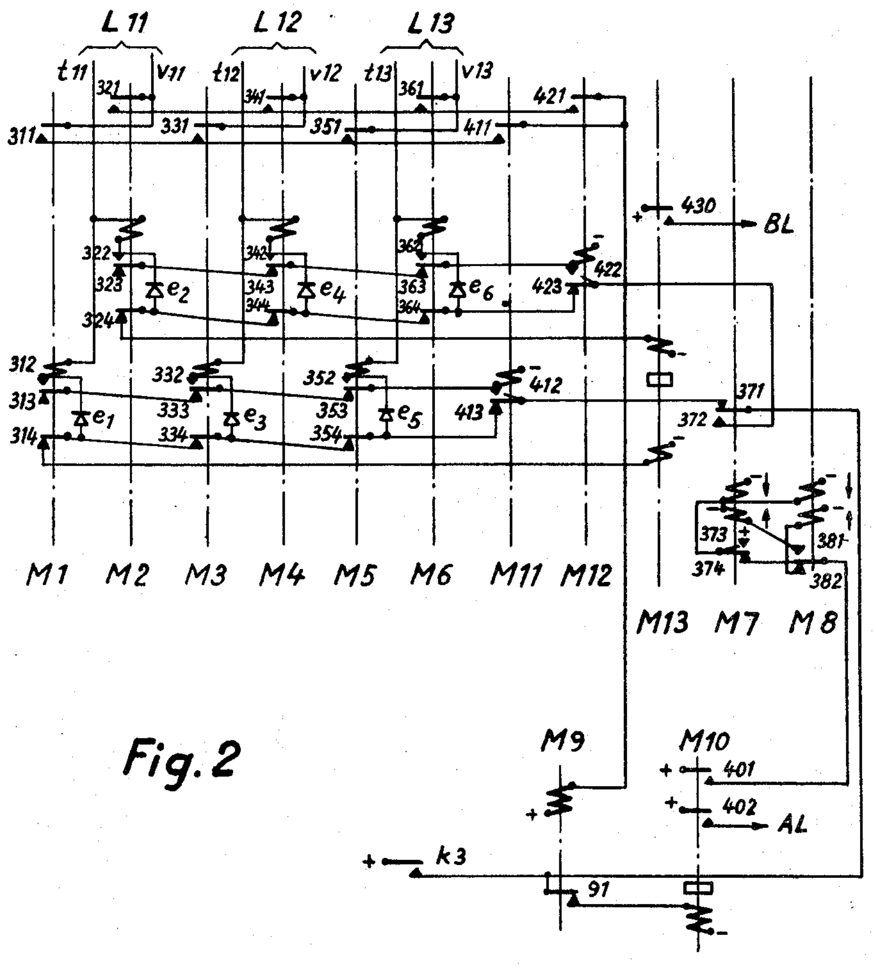
Fig. 2 shows a selecting relay chain for selecting from the marker a disengaged line or apparatus.

The signal receiving device S then receives signals from line L1, and the marker starts a switching operation, during which the contact *k3*, which is shown as well in Fig. 1 as in Fig. 2, is closed.

In Fig. 2 a relay device M1—M13 for selecting any one of a number of lines L11—L13 is shown, said lines forming a group. Contact *k3* closes the following circuits: +, the contacts *k3*, 371 and 413, the parallel circuits through the rectifier *e5*, the winding of relay M5, marking wire *t13*, contact 354, rectifier *e3*, the winding of relay M3, wire *t12* and contact 334, rectifier *e1*, the winding of relay M1, wire *t11*, to negative in the respective disengaged line equipments. If any of said circuits is closed, the corresponding relay M1, M3 or M5, for instance M5, is energized. The contacts 351—354 are actuated. Relay M11 is energized over the contacts *k3*, 371 and 413, rectifier *e5* and contact 352, and the contacts 411—413 are actuated by said relay. The contacts 412—413 switch over continuously. The relays M11 and M5 are then energized over the contacts 412 and 352, the circuits energizing the relays M1 and M3 being disconnected by contact 413 and the holding circuits by contact 353. The contacts 351 and 411 close a circuit over the marking wire *v13* through the winding of relay M9, said relay actuating contact 91.

During the described process the circuit is closed over the contacts *k3* and 91 through the winding of relay M10, which is slow-operating. Should there be any fault, contact 91 is not breaking before relay M10 having been magnetized, and the contacts 401—402 are actuated. An alarm device is actuated by contact 402 and contact 401 closes the following circuits for the relays M7—M8, which have each two equal but each other counteracting winding: +, the contacts 401 and 382, the lower winding of relay M8 and contact 374, respectively, and the upper windings of the relays M7 and M8. Relay M7 but not relay M8 is magnetized. The contacts 371—374 are actuated. The relay chain M1, M3, M5 is cut off by contact 371 and the relay chain M2, M4, M6 is connected. Relay M6 will operate instead of relay M5 and the contacts 361—364 are actuated. Relay M9 breaks the current for relay M10, which releases its armature. Contact 401 breaks and relay M8, being energized only through its upper winding, is magnetized and the contacts 381—382 are actuated by said relay. The relays M7 and M8 are then kept energized until a fault occurs in the relay chain M2, M4, M6, whereby the armature of relay M10 is again attracted by said relay, and contact 401 closes, relay M7 being de-energized because of a circuit over the contacts 401 and 381 and the lower winding of the relay. Relay M8 is kept energized while contact 401 is closed over a circuit due to the contacts 401 and 374 and the upper winding of relay M8. If a connection then takes place over the relay chain M1, M3, M5, relay M9 is attracted and relay M10 releases. Contact 401 opens and relay M8 releases its armature.

If all the lines L11—L13 in the group are busy, none of the relays M1—M6 will be energized, and relay M13, which is slow-operating, is energized in the following circuit: +, the contacts *k*3, 371 or 372 depending on the position of the relay M7, the contacts 413, 354, 334 and 314, the lower winding of relay M13, or the contacts 423, 364, 344 and 324, the upper winding of relay M13, to negative. Relay M13 is energized and contact 430 is actuated. A circuit for indication of busy condition is closed over wire BL.

I claim:

An automatic telephone system comprising a marker, a plurality of lines, a test conductor and at least one marking conductor for each of said lines, said marker including two relay chains, each chain comprising a relay for each line connected in a control circuit with said test conductor, each relay controlling contacts connected in circuit for preventing the simultaneous energization of more than one relay in a chain, and each relay further controlling at least one make contact for closing a circuit from the marker over said marking conductor to a relay for the corresponding line, circuit means controlled by the operation of a relay in one chain for disconnecting the other chain, and rectifying means connected in series with each relay to prevent leakage-current paths.

References Cited in the file of this patent

UNITED STATES PATENTS

| | | |
|---|---|---|
| 2,291,752 | Parker | Aug. 4, 1942 |
| 2,326,551 | Mohr | Aug. 10, 1943 |
| 2,410,304 | Powell | Oct. 29, 1946 |
| 2,612,564 | Oberman | Sept. 30, 1952 |